United States Patent [19]

Reich et al.

[11] Patent Number: 5,791,717
[45] Date of Patent: Aug. 11, 1998

[54] FOLDING TAILGATE RAMP

[76] Inventors: Terry Gene Reich, 43600 Bracekn Drive, Chilliwack, British Columbia, Canada, V2R 4A3; Douglas Cecil Reich, 201 - 9540 Cook Street, Chilliwack, British Columbia, Canada; Robert Frederick Young, 11467 Roxburgh Road, Surrey, British Columbia, Canada, V3R OW4

[21] Appl. No.: 655,650

[22] Filed: May 30, 1996

[51] Int. Cl.⁶ ............................................. B62D 33/03
[52] U.S. Cl. ...................... 296/61; 414/537; 14/71.1
[58] Field of Search .................. 296/57.1, 61; 14/69.5, 14/71.1; 414/537

[56] References Cited

U.S. PATENT DOCUMENTS

| | | | |
|---|---|---|---|
| 3,352,440 | 11/1967 | Wilson. | |
| 3,642,156 | 2/1972 | Stenson | 296/61 X |
| 3,834,565 | 9/1974 | Goodman, Jr. et al. | 296/61 X |
| 3,976,209 | 8/1976 | Burton | 296/61 X |
| 4,761,847 | 8/1988 | Savage et al. | 14/69.5 |
| 4,779,298 | 10/1988 | Nichols, Sr. et al. | 14/69.5 |
| 4,913,615 | 4/1990 | Ward | 414/537 |
| 5,312,148 | 5/1994 | Morgan | 296/61 |
| 5,440,773 | 8/1995 | Lentini | 14/69.5 |

FOREIGN PATENT DOCUMENTS 1439703  6/1976  United Kingdom ............... 14/69.5

*Primary Examiner*—Dennis H. Pedder
*Attorney, Agent, or Firm*—Seed and Berry LLP

[57] ABSTRACT

Previous folding ramps for attachment to pickup truck tailgates required complicated cable supports to make them light enough to lift when closing the tailgate while strong enough to bear heavy loads when unfolded. The present invention provides a folding ramp for attachment to a pick-up truck tailgate wherein the structural support is provided by rigid parallel ribs, each rib hinged to fold flat against the underside of the ramp, and divided into separate sections which fold with the separate panels. Preferably there are two sets of parallel rib sections, each formed of sections connected by short flexible cable lengths.

8 Claims, 7 Drawing Sheets

FOLDING TAILGATE RAMP

TECHNICAL FIELD

The invention relates to the field of loading ramps for attachment to the tailgate of a pick-up truck or the like.

BACKGROUND ART

Folding loading ramps are known which are secured to the tailgate of a pickup truck to permit the loading of snowmobiles, tractors or other heavy items onto the truck bed from ground level. Such ramps are foldable to permit the tailgate to be closed when loading is completed. Two such folding ramps are shown in U.S. Pat. No. 3,352,440 issued Nov. 14, 1966 to Wilson and U.S. Pat. No. 3,642,156 issued Feb. 15, 1972 to Stenson. Such ramps require considerable strength to withstand the necessary loads and consequently are made of heavy metal which causes the tailgate to be difficult to lift with the ramp in folded position. Various solutions have therefore been sought to provide a lighter means of strengthening a folding ramp. For example, U.S. Pat. No. 4,761,847 issued Aug. 9, 1988 to Savage et al., and U.S. Pat. No. 5,312,148 issued May 17, 1994 to Morgan disclose folding ramps which utilize cable and hinge systems to strengthen the ramp in the operating position while reducing its weight. It remains that the cables in such systems are unruly when the ramp is being folded and make the product less attractive and more difficult to fold.

It is therefore an object of the present invention to provide a folding ramp for attachment to a tailgate which is manageable in terms of weight and is reinforced by a system which avoids unruly cabling.

DISCLOSURE OF INVENTION

The present invention provides a folding ramp for attachment to a pick-up truck tailgate or other surface, wherein the structural support is provided by rigid, sectioned, parallel ribs, each rib hinged to fold flat against the underside of the ramp, and divided into separate sections which fold with the separate panels. Preferably there are two sets of parallel rib sections, each formed of sections connected by short flexible cable lengths.

BEST MODE(S) FOR CARRYING OUT THE INVENTION

Figure 1:
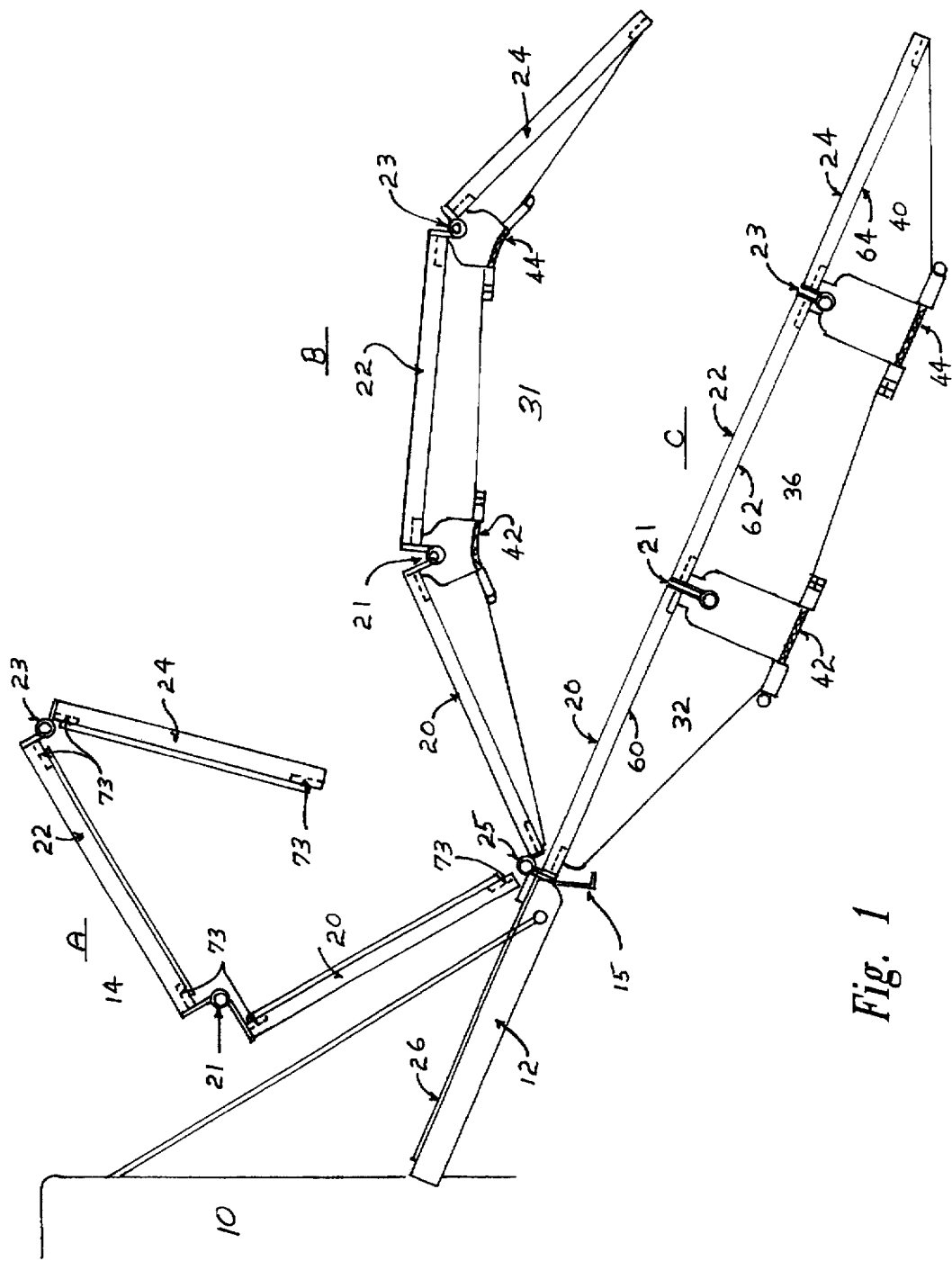
FIG. 1 is an elevational view showing the ramp of the invention attached to a pick-up truck tailgate, in various stages of unfolding, with only a portion of the truck illustrated.

With reference to the drawings, the box 10 of a pick-up truck has a tailgate 12. The folding ramp 14 of the invention is shown in three stages A, B and C of unfolding in FIG. 1. Folding ramp 14 consists of three rectangular folding panels 20, 22, 24, which are joined by piano hinges 21, 23. A planar sheet 26 is joined to panel 20 by piano hinge 25. Sheet 26 is secured to tailgate 12 by spot rivets. Each panel 20, 22, 24, 26 is formed of 16 gauge steel, galvanized and powder coated and slip resistant with V-ridges stamped into the metal for strength. The edges of panels 20, 22, 24 are folded down in edges 25. Two parallel sectioned ribs 31, 33 formed of rib sections 30, 34, 38; and 32, 36 and 40 are hingedly attached to respective panels 20, 22, 24. Each rib section is preferably formed of ¼-inch steel plate, although different thicknesses will be suitable for different sizes of ramps. Each rib section is hingedly connected to its respective panel at either end of edges 60, 62, 64, 66, 68, 70 by pin hinges 73. Adjacent panels 32 and 36, and 36 and 40 are connected by flexible cables 42, 44, and adjacent panels 30 and 34, and 34 and 38 are connected by flexible cables 46, 48.

Figure 2:
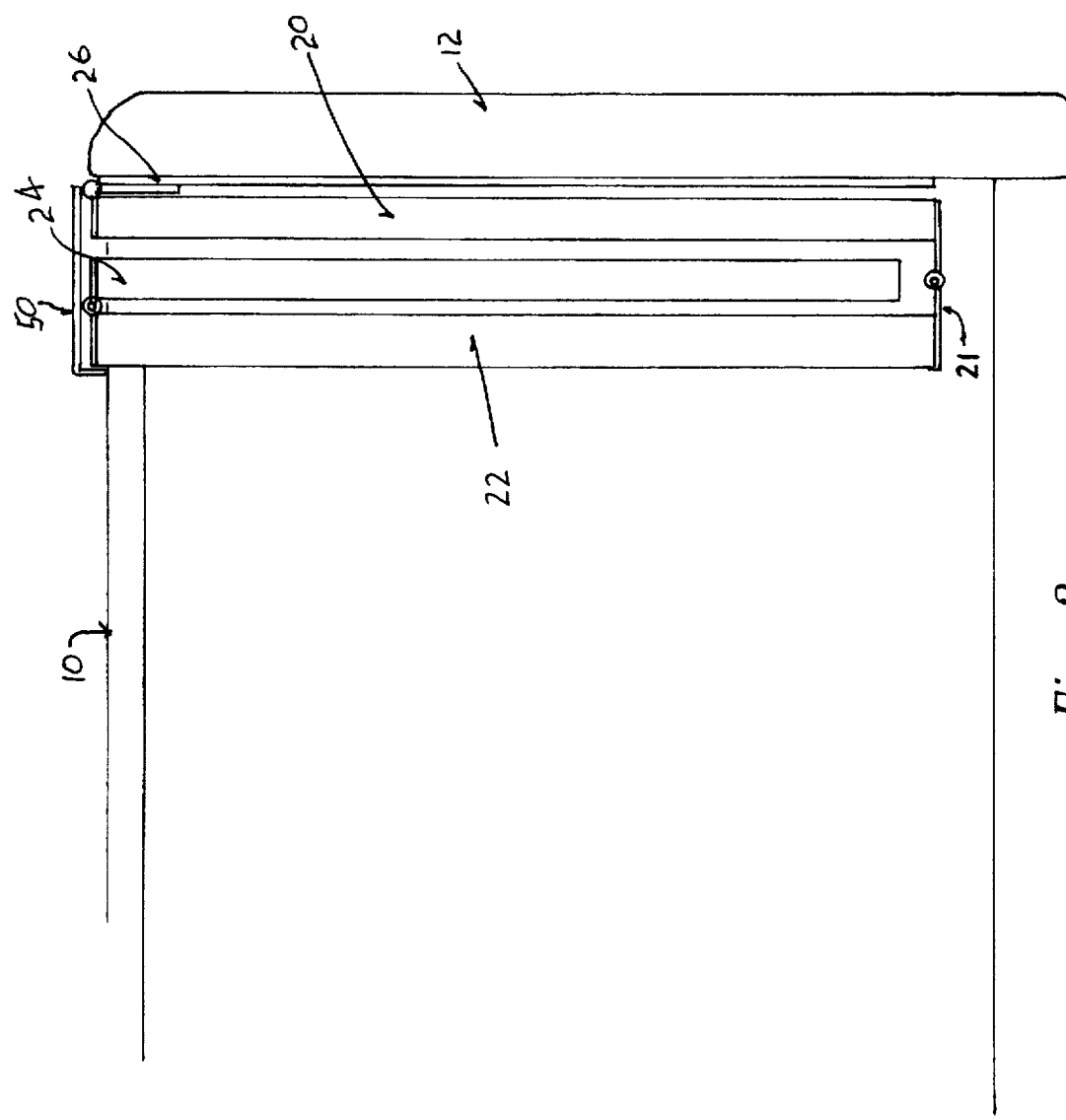
FIG. 2 is an elevational view showing the ramp of the invention attached to a pick-up truck tailgate in folded configuration, with only a portion of the truck illustrated.

As illustrated in FIG. 2, which shows the ramp in folded condition with the tailgate 12 raised against the pickup truck bed 10, the length of panel 24 is somewhat less than that of panels 20, 22 so that it can be folded between such panels. It is also required that piano hinge 21 be wider than the combined thicknesses of panels 20, 22, 24. A snapfit closure 50, which is hingedly attached to hinge 25, retains the three panels in folded condition.

Figure 3:
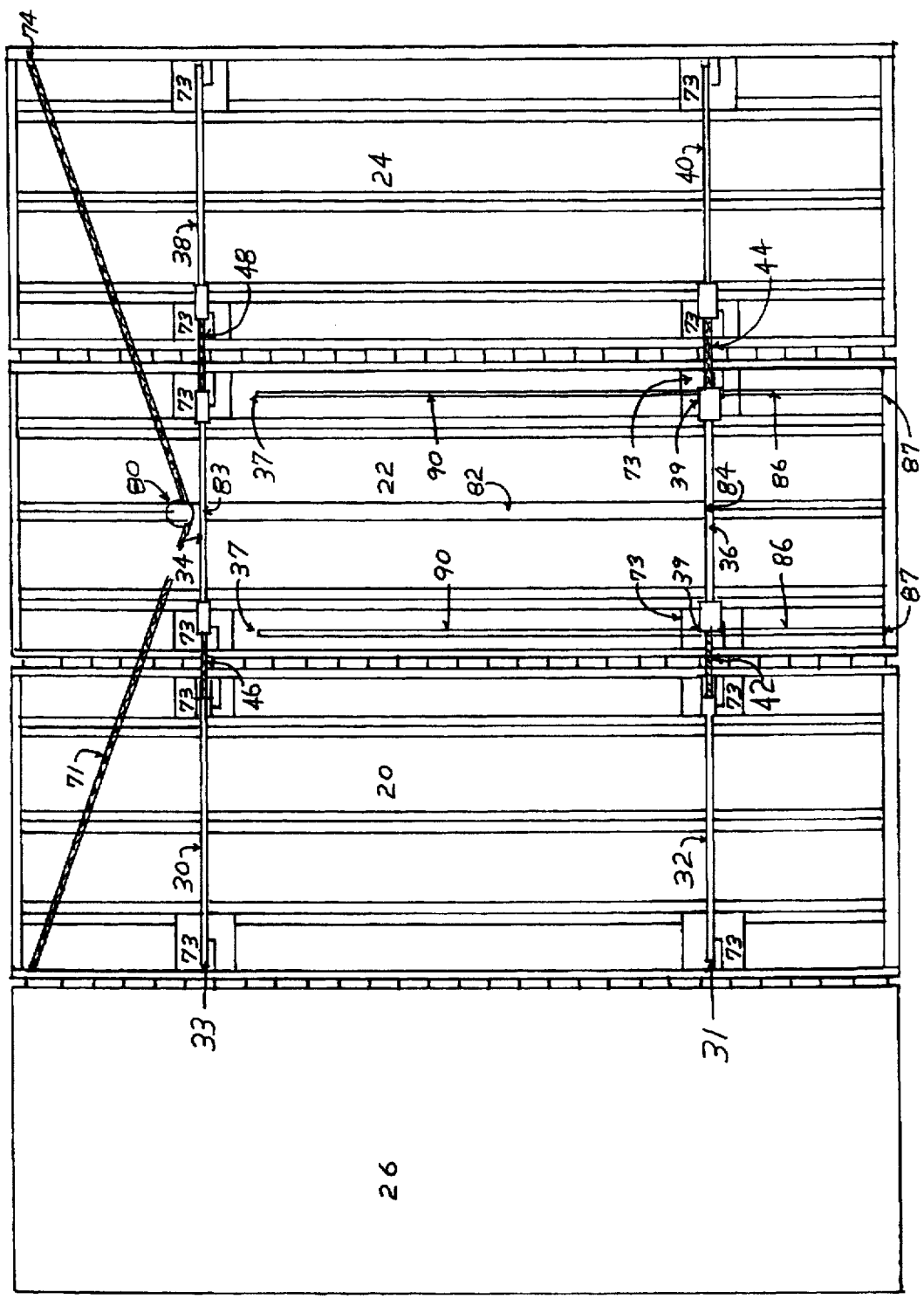
FIG. 3 is a bottom view showing the ramp of the invention in unfolded condition.

Rib sections 30 through 40 are hinged at hinges 73 to lie flat when the panels are folded as shown in position A in FIG. 1. A cable 71 is stretched between point 72 on panel 20 and point 74 on panel 24 as shown in FIG. 3. Cable 71 abuts sheave 80 which in turn is fixed to rib section 34. A hinged spacer bar 82, is hinged at ends 83, 84 at rib sections 34, 36 so that when the panels are unfolded, cable 71 tightens and draws rib 33 to a position perpendicular to panel 22, which in turn raises rib 31 to a perpendicular position in respect of panel 22 by virtue of spacer bar 82. Rubber tension straps 90, secured at ends 37 to panel 22 and at end 39 to the top of rib section 36 apply tension to rib 31 when the ramp is unfolded so that the ribs return to a flat position when folded. Rigid spacer bar 82 keeps ribs 31, 33 in parallel spaced relation when the ramp is unfolded. Rigid stops 86 secured to panel 22 at edge 87 at one end and rib section 36 at the other end limit the rotation of ribs 31, 33 to the perpendicular position relative to the panels.

Figure 5:
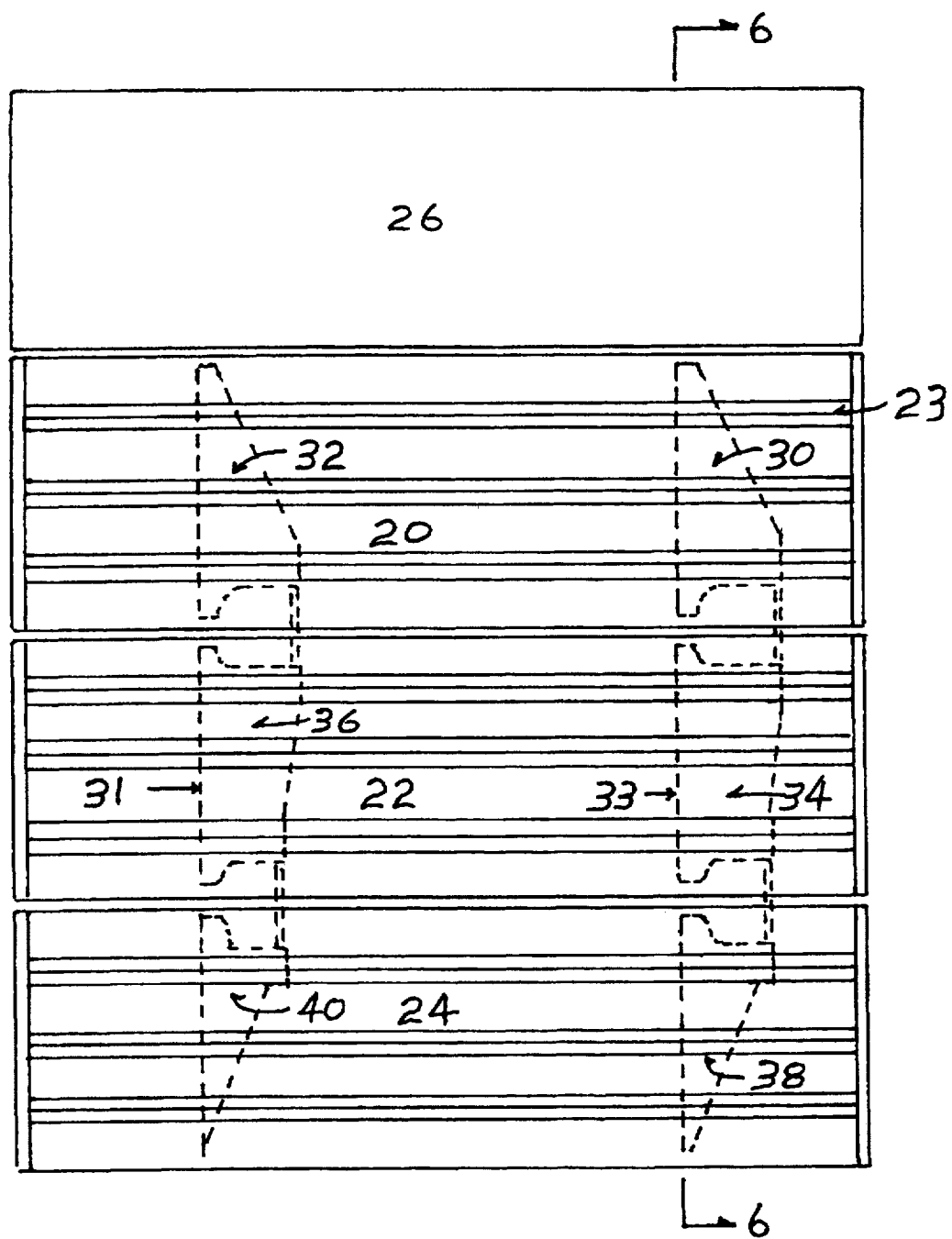
FIG. 5 is a bottom view showing the panels unfolded with the ribs shown in solid lines when the panels are unfolded and with the ribs shown in dotted outline as they would lie in a position against the panels when the panels are folded.
Figure 6:
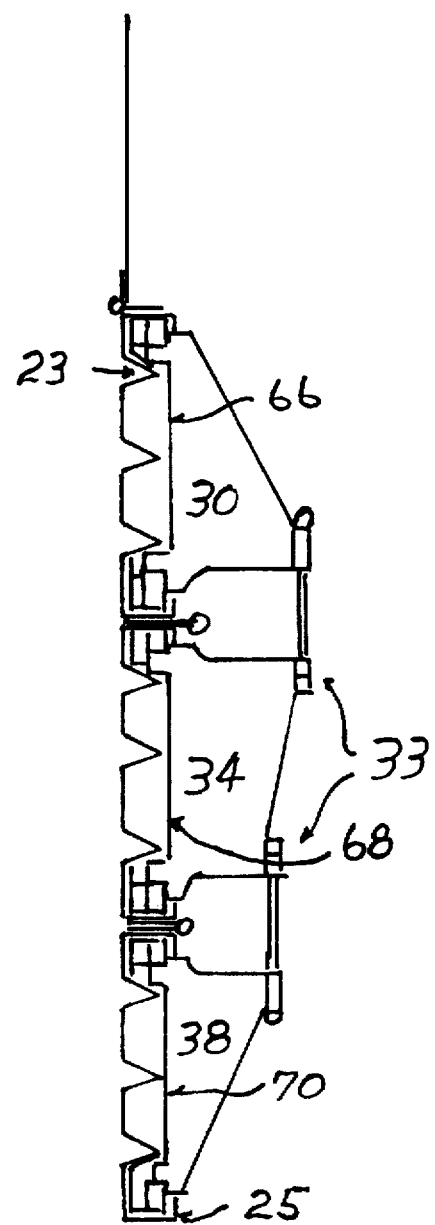
FIG. 6 is a cross section bottom view showing the ribs in unfolded condition taken along lines 6—6 of FIG. 5.

When the panels are folded, cable 71 is loosened, and the straps 90, which are under tension when the panels are unfolded similarly loosen, the weight of the ribs causing them to lower towards the position shown in FIG. 5 lying against the panels. As the panels fold, (see B in FIG. 1) the rib sections progressively fold relative to each other as described below until lying flat against the panels as in A in FIG. 1.

Figure 4:
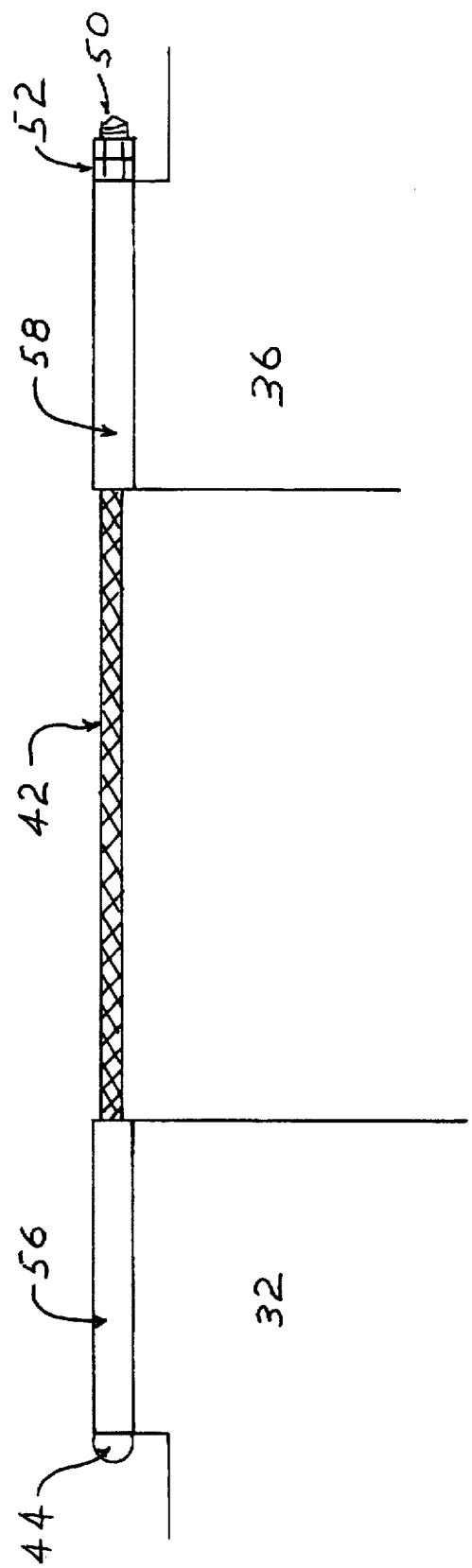
FIG. 4 is a detail view showing the cable connecting adjoining ribs.

FIG. 4 shows the flexible cable 42 between ribs 32, 36 in detail. It is preferably a rope style braided metal (steel) aircraft cable. One end of the cable has a stop 44. The cable extends through metal tubes 56 and 58 secured to ribs 32 and 36. A threaded bolt 50 is secured to the opposite end of the cable. The cable is tightened between ribs 32, 36 by nuts 52 on bolt 50. Cables 46, 48 are constructed similarly. As panels 20, 22, 24 are folded, and ribs 31, 33 approach a position lying adjacent the respective panels, the rib are able to fold with each associated panel due to the flexibility of cables 42, 44, 46, 48.

Figure 7:
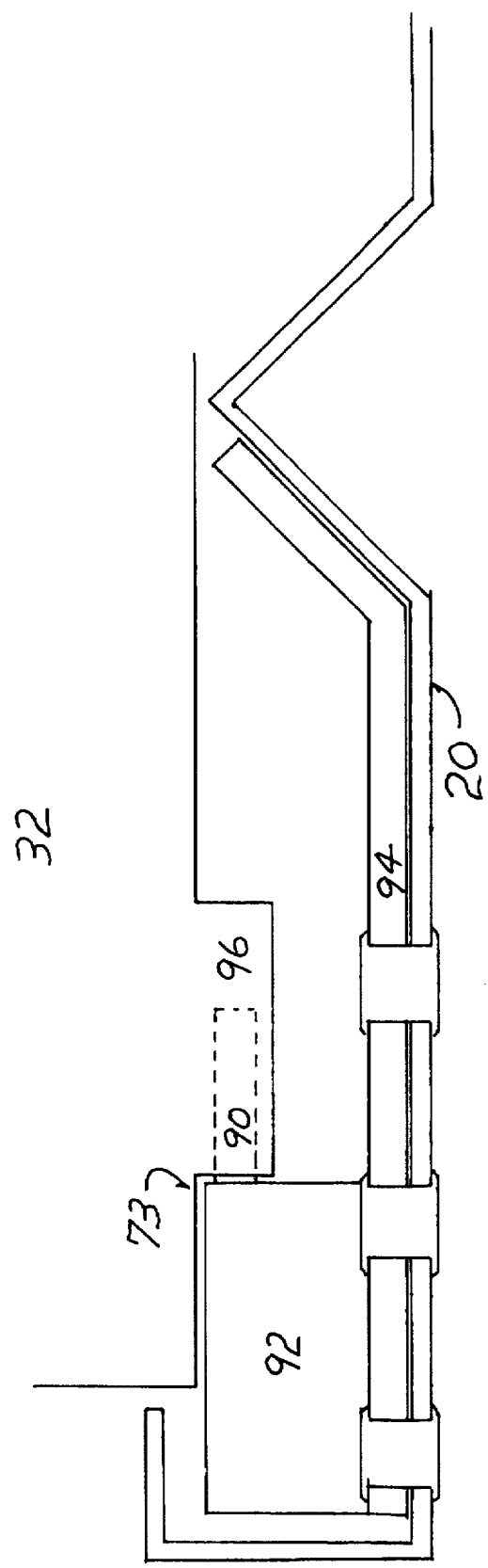
FIG. 7 is a detail of the rib hinge pin arrangement.

FIG. 7 illustrates the structure of the pin hinges 73. A pin 90 is mounted on plate 92 secured to plate 94 which in turn is riveted to panel 20. Rib section 32 has an extension 96 which rotates on pin 90.

For a typical arrangement with three panels, the panel lengths are 5 feet and the respective widths are 19 inches for panel 26, 18¾" for panels 20 and 22 and 17¾" for panel 24.

While the invention has been described as applied to the tailgate of a pickup truck, it will be apparent that it also has application to loading docks, the rear entry of moving vans and the like. Also, while three panels have been described, other numbers and sizes of panels could be used according to the height of the pick-up and the like.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A folding ramp adapted to be fixed to a surface comprising:

i) a first means for attachment of said ramp to said surface;

ii) a plurality of parallel load supporting panels, each having upper and lower surfaces and parallel ends and sides;

iii) first hinge means pivotally attaching a first load supporting panel to said first attachment means;

iv) hinge means pivotally attaching adjoining load supporting panels;

v) parallel ribs extending parallel to the sides of said load supporting panels, each rib formed of a plurality of collinear sections, the number of sections corresponding to the number of load supporting panels, each section hingedly connected to a panel and connected to the adjacent section by a flexible cable; and vi) means for raising said parallel ribs to a position perpendicular to said panels when said panels are unfolded.

2. The folding ramp of claim 1 wherein said surface is a pick-up truck tailgate.

3. The folding ramp of claim 1 wherein said means for raising said parallel ribs comprises a sheave secured to one rib and a cable abutting said sheave and secured at either end thereof to separate load bearing panels.

4. The folding ramp of claim 1 wherein rigid means are provided joining first and second parallel rib sections to maintain said sections in parallel spaced relationship.

5. The folding ramp of claim 1 wherein biassing means are provided secured to one of said first and second parallel rib sections to bias said sections to a position parallel to said panels.

6. The folding ramp of claim 1 wherein rigid spacer means are provided joining first and second of said parallel ribs.

7. The folding ramp of claim 1 wherein there are three load bearing panels, a third panel furthest from the attachment means being shorter than the remaining two, and the hinge between the remaining two being wider when extended than said third panel.

8. The folding ramp of claim 1 wherein means is provided for securing said folded panels when in place folded on said surface.

* * * * *